United States Patent
Koch et al.

[11] Patent Number: 5,387,476
[45] Date of Patent: Feb. 7, 1995

[54] POWER CONNECTION ELEMENT FOR SOLID-ELECTROLYTE FUEL CELLS

[75] Inventors: Alfred Koch, Meersburg; Richard Spaeh, Ueberlingen; Wolfgang Schaefer, Friedrichshafen, all of Germany

[73] Assignee: Dornier GmbH, Germany

[21] Appl. No.: 208,746

[22] Filed: Mar. 11, 1994

[30] Foreign Application Priority Data

Mar. 11, 1993 [DE] Germany ............................ 4307666

[51] Int. Cl.⁶ .............................................. H01M 8/02
[52] U.S. Cl. .......................................... 429/12; 429/30; 252/521
[58] Field of Search .................... 429/12, 30, 31, 32, 429/33; 252/518, 519, 521; 501/108, 118, 153

[56] References Cited

U.S. PATENT DOCUMENTS

| | | | |
|---|---|---|---|
| 4,645,622 | 2/1987 | Kock | 429/12 X |
| 4,749,632 | 6/1988 | Flandermeyer et al. | 429/33 X |
| 5,049,456 | 9/1991 | Matsuhiro et al. | 429/12 |

FOREIGN PATENT DOCUMENTS

| | | |
|---|---|---|
| 338823 | 10/1989 | European Pat. Off. . |
| 395400 | 10/1990 | European Pat. Off. . |
| 410159 | 1/1991 | European Pat. Off. . |
| 446680 | 9/1991 | European Pat. Off. . |
| 410166 | 1/1991 | Germany . |
| 3922673 | 1/1991 | Germany . |

*Primary Examiner*—Anthony Skapars
*Attorney, Agent, or Firm*—Evenson, McKeown, Edwards & Lenahan

[57] ABSTRACT

A power connection element for planar fuel cells, comprising a cell-side ceramic plate, a joining layer made of electrically conductive glass which is viscous under operating conditions, and a metallic current collector plate. All three joined elements exhibit a mutually compatible thermal expansion behavior.

11 Claims, 2 Drawing Sheets

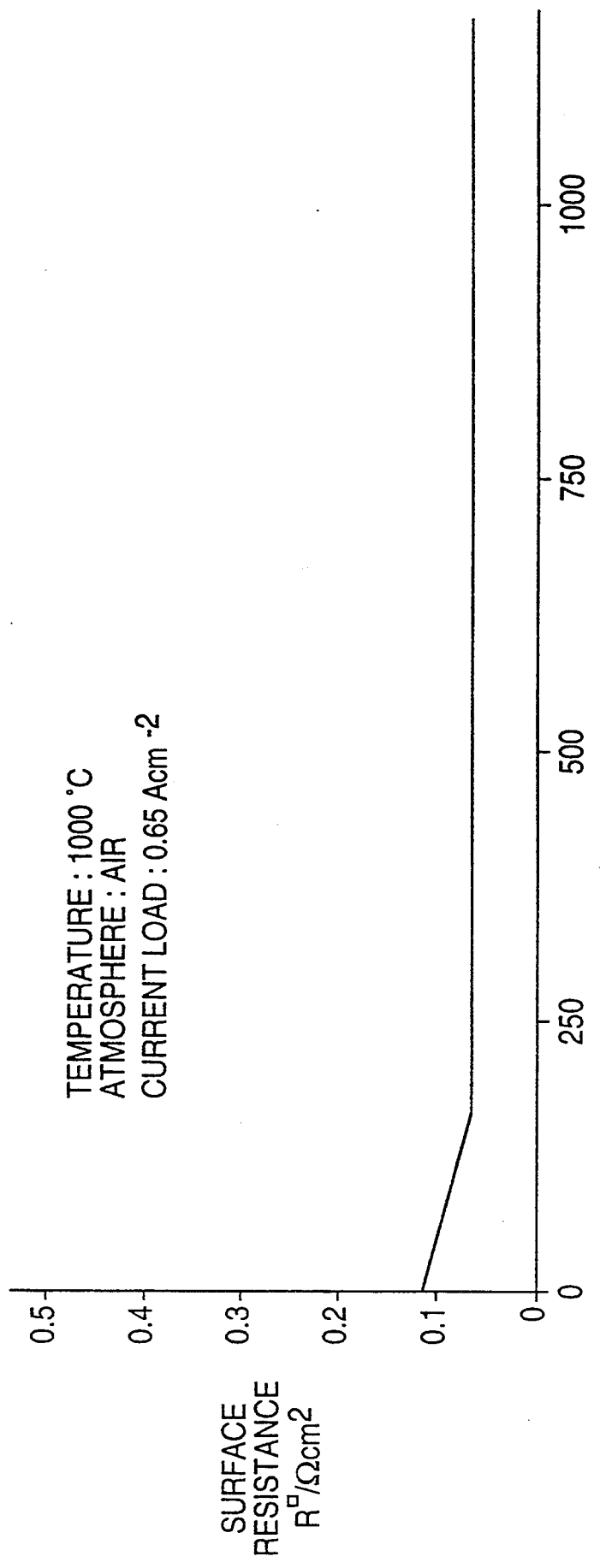

POWER CONNECTION ELEMENT FOR SOLID-ELECTROLYTE FUEL CELLS

BACKGROUND AND SUMMARY OF THE INVENTION

This invention relates to a structural element for the electrical power connection of solid-electrolyte fuel cells arranged in a stack.

Solid-electrolyte fuel cells are electrochemical energy converters which generate current directly from gaseous energy carriers (such as $H_2$, CO, $CH_4$). As a rule, they are based on zirconium oxide as the oxygen-ion-conducting solid electrolyte, and are operated at temperatures of from approximately 800° to 1,000° C. Since they are not subject to the Carnot cycle which governs the operation of thermal heat engines, they can achieve higher degrees of efficiency, above 50%. For this reason and because of their low emission of pollutants, they have a high potential for use as future energy converters, particularly when they use natural gas as the primary energy carrier.

In view of its economic efficiency and high energy density, a planar cell design is advantageous. In this arrangement, thin solid-electrolyte plates are coated on both sides with porous electrodes and are stacked above one another alternately with connecting elements so that a bipolar arrangement is created. Several individual cells may be connected in series.

The arrangements described herein for fuel cells may also be used for the reversal process of high-temperature electrolysis in order to produce hydrogen from water at approximately 800° to 1,000° C. with a high degree of efficiency.

The previously known techniques for making electrical contact between such cells (in an oxidizing environment) are all based on the use of precious metals. There is therefore considerable interest in the development of costeffective current collectors using components which are free of precious metals.

Heretofore, for the planar introduction of current into the flat cell stacks, the stack end plates were coated with a conducting platinum paste, and frames or wide-mesh grids made of platinum wire were then joined to the platinum layer, also by means of platinum paste. External power connections that do not use precious metals have not been known so far.

For the internal electrical connection of, for example, ceramic electrodes on metallic cell interconnectors, precious metals or thin intermediate layers of conductive oxides are also used, such as disclosed in European Patent Documents EP 410 159 A1, EP 410 166 A1, EP 446 680 A1, and EP 338 823 A1, as well as in H. Tsumeirumi, et al.: "Development of Solid Oxide Fuel Cell with Metallic Separator". In order to compensate for discrepancies in the thermal coefficients of expansion, arrangements are sometimes created which require high expenditures. (See European Patent Document EP 410 159 A1).

FIG. 1 shows the basic construction of a power connection for a solid-electrolyte fuel cell stack to which the connecting arrangement according to the invention can be applied. A laminar current collector plate 1 connected with the current line 2 of the power consumer is mounted on the fuel cell stack 3 to draw current from the stack end plates 4. For this purpose, the current collectors are made of a metal other than precious metals, for reasons of economic efficiency.

A direct electric connection between the ceramic end plate of the fuel cell stack and the metallic terminal board (made of Fe-, Co-, Cr- or Ni-alloys) is not possible, because strong interface reactions with the formation of insulating layers drastically increase the resistance.

The problems of this electrical connection arrangement relate to the ceramic-metal transition, particularly:

a) the adaptation of the thermal coefficient of expansion of the metallic current collector to that of the ceramic cell stack in order to ensure a planar and non-positive connection, taking into account the difference between room temperature and operating temperature;

b) the electric characteristics and growth of the oxide layer which forms on the current collector under operating conditions;

c) the low-impedance electric transition via one or several comparatively poorly conducting intermediate layers, which requires that the transition metallic current collector—intermediate layers—ceramic stack end plate should be as planar and as form-locking as possible, and should have the smallest possible distance. (That is, the intermediate layers should be as thin as possible.)

It is an object of the present invention to provide a planar, low-impedance electric connection between a solid-electrolyte fuel cell stack and the current lines to the consumer, which connection is durable, has a long operating life, is capable of functioning at 800° to 1,000° C. in an air atmosphere, and does not require the use of precious metals.

This object is achieved according to the invention by means of the following composite of the current collector—intermediate layer—stack end plate:

a) Ceramic stack end plates of the composition

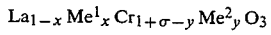

$$La_{1-x} Me^1_x Cr_{1+\sigma-y} Me^2_y O_3$$

with $0 \leq x \leq 0.3$; $0 \leq y \leq 0.5$; $0 \leq \sigma \leq 0.05$, wherein $Me^1$ is Ca, Sr or mixtures thereof, and $Me^2$ is Al, Mg, Co, Fe or mixtures thereof;

b) intermediate layer made of conductive glass with a thermal expansion coefficient of between $8 \cdot 10^{-6} K^{-1}$ and $12 \cdot 10^{-6} K^{-1}$ in the temperature range of from 20° C. to a TG below 1,000° C. (TG means the transformation temperature; see, for example, Horst Scholze "Glass, Nature, Structure and Characteristics", 2nd Edition, Berlin 1977, Page 5), and a minimum conductivity of 0.1 $Scm^{-1}$ at 1,000° C., the glass containing alkalis or alkaline earths in an amount from 1 to 20% by weight, as well as one or several metal oxides with several valency stages in the amount of from 10 to 85 percent by weight. Alternatively, the intermediate layer may also consist of a predominantly oxidic material with a minimum conductivity of 0.1 $Scm^{-1}$ at 1,000° C., or a mixture of glass of the above-mentioned type and a predominantly oxidic material with a minimum conductivity of 0.1 $Scm^{31\ 1}$ at 1,000° C., and having cations which increase its conductivity.

c) current collector plate (power connection plate) made of a metal having a thermal expansion coefficient of between $8 \cdot 10^{-6} K^{-1}$ and $12 \cdot 10^{-6} K^{-1}$ in the temperature range of 20° to 1,000° C., and consisting of a chromium, iron, nickel or cobalt base alloy which contains additional alloy elements of chromium, iron, nickel, cobalt or others in a range of from 0.10 to 40% by weight, as well as dispersed oxides in a range of from 0.02 to 10% by weight.

The connection arrangement according to the invention provides an external power connection for a solid-electrolyte fuel cell stack, which is free of precious metals. This connection comprises a composite of a ceramic stack end plate, a joining layer made of an electrically conductive glass which is viscous under operating conditions, and a metallic current collector plate, all three of which elements exhibit a mutually compatible expansion behavior.

Because of the mutually adapted thermal coefficients of expansion, thermally induced tensions which occur, for example, in the case of temperature changes from room to operating temperature, and which can endanger or even damage the composite, are avoided. Because of the viscous characteristics of the intermediate-layer material at operating temperature, the distance between the current collector plate and the stack end plate can be reduced to a minimum while the surface contact is maximized. Moreover, because of the electric conductivity of this intermediate layer, a low-impedance current transition is ensured. Because of the viscous intermediate layer, a change of geometry, which may occur during operation (for example, the expansion of the stack end plate during introduction of the fuel gas into the stack), can be absorbed.

The current transition from the stack to the current collector plate takes place completely without precious metals, and may be continued via a welded-on consumer line, such as wires or metal sheets made of a nickel, cobalt or iron base alloy.

The power connection plate may be made, for example, of a chromium alloy of from 90 to 100% Cr and up to 10% rare-earth oxides or iron oxides or mixtures of the two.

In a first embodiment, the power connection element according to the invention may be connected with the last cell of the fuel cell stack via an additional layer made of an electrically conductive oxide.

In another embodiment, the component comprises the current collector plate and the stack end plate, but no intermediate layer.

The composite according to the invention may be made, for example, by screen printing and hot pressing in a manner that is know, *per se*. The power connection element may also be used as a bipolar plate within a fuel cell stack for the series connection of the cells.

Other objects, advantages and novel features of the present invention will become apparent from the following detailed description of the invention when considered in conjunction with the accompanying drawings.

BRIEF DESCRIPTION OF THE DRAWINGS

FIG. 3 is a graphic depiction of the surface resistance of a component according to the invention, which was tested over a period of 1000 hours.

DETAILED DESCRIPTION OF THE DRAWINGS

Figure 1:
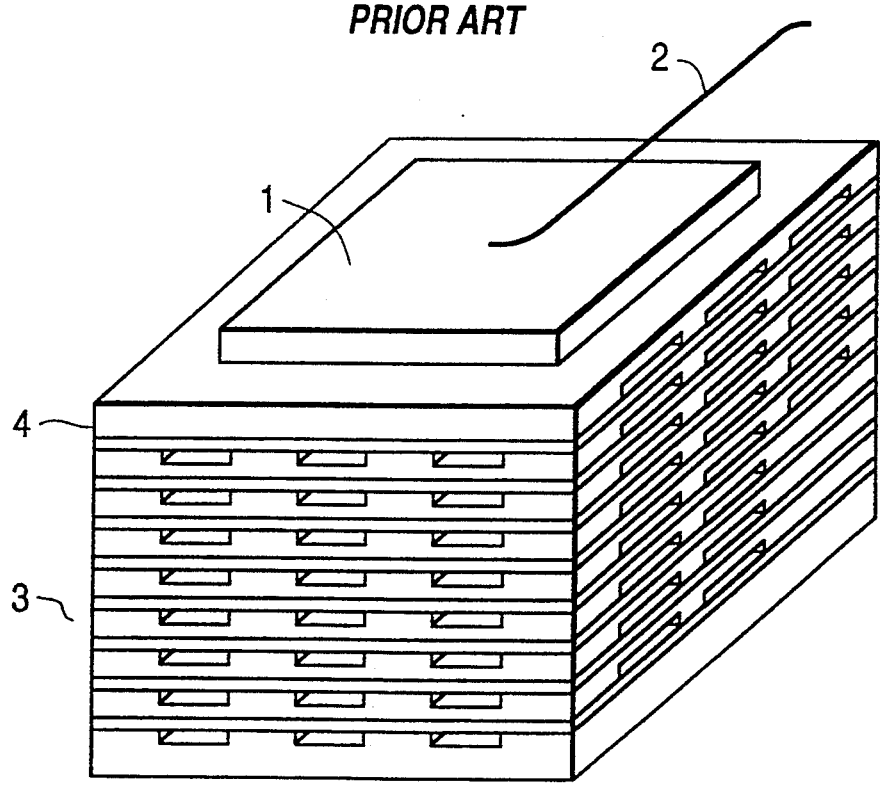
FIG. 1 is a view of a conventional electrical connection for a solid-electrolyte fuel cell stack.
Figure 2:
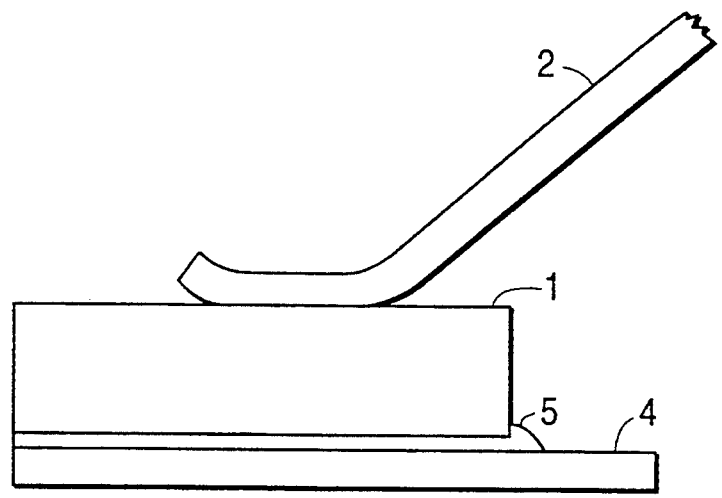
FIG. 2 is a schematic representation of a power connection element according to the invention.

An example of an external power connection for a flat cell stack, according to the invention, is illustrated in FIG. 2. The feed wires 2 made of superalloy No. 214 with a diameter of 2 mm available from Haynes Company, Kokomo, Ind. USA, are point-welded to chromium plates 1, consisting of 99% Cr and 1% $Y_2O_3$, with a thickness of 2 mm and a surface area of $25 \times 25$ mm. The feed wires may also be made from nickel, cobalt or iron base alloys; and metal sheets or strips may be used instead of wires.

The chromium plate, in turn, is coupled to the stack end plate 4 by means of an electrically conductive glass layer 5, produced by melting glass beads made of sodium silicate of the grain size fraction 0–50 μm and 40% by volume of iron (III) oxide. In this process, the components are assembled at room temperature at a pressure of approximately $10^4$ N/m², and then heated to 1100° C. under the same pressure. If the pressure is increased to $2.10^7$ N/m² the process can be performed at 900° C.

The stack end plates of the flat cell stack are made of $La_{0.84}Sr_{0.16}Cr_{1.03}O_3$, with membranes made of yttrium-stabilized $ZrO_2$ which, in addition, contains 4 mol. % $Al_2O_3$.

For the electric transition between the Haynes 214 wire, chromium plate, conductive glass and stack end plate, at 1,000° C., air atmosphere and a current density of 0.65 A/cm² in the current collector, a surface resistance of 130 mΩ cm² was measured as the initial value. FIG. 3 shows the endurance of this surface resistance at 1,000° C., air atmosphere and a constant current of 0.65 A/cm² for a time period of more than 1,000 h.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A power connection element for planar fuel cells having a solid electrolyte on a $ZrO_2$ base, said power connection element comprising:

a ceramic plate having the composition

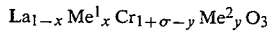

$$La_{1-x} Me^1_x Cr_{1+\sigma-y} Me^2_y O_3$$

wherein $0.0 \leq x \leq 0.3$; $0 \leq y \leq 0.5$; $0 \leq \sigma \leq 0.05$, and wherein $Me^1$ is one of Ca, Sr and mixtures thereof, and $Me^2$ is one of Al, Mg, Co, Fe, and mixtures thereof;

an intermediate layer made of conductive glass which has a coefficient of thermal expansion of between $8 \cdot 10^{-6} K^{-1}$ and $12 \cdot 10^{-6} K^{-1}$ in the temperature range of from 20° C. to a transformation temperature of below 1,000° C., and a minimum conductivity of 0.1 S.cm⁻¹ at 1,000° C., said conductive glass containing alkalis or alkaline earths in an amount of from 1.0 to 20% by weight, and at least one metal oxide with several valency stages in an amount of from 10 to 85% by weight; and a current collector plate made of a material having a thermal expansion coefficient of between $8 \cdot 10^{-6} K^{-1}$ and $12 \cdot 10^{-6} K^{-1}$ in the temperature range of 20° to 1,000° C., which material consists of a base alloy which is one of chromium, iron, nickel and cobalt, and which contains additional alloy elements in an amount of from 0.10 to 40% by weight, and dispersed oxides in an amount of from 0.02 to 10% by weight.

2. A power connection element according to claim 1, wherein the power connection plate is made of a chromium alloy of the composition of 90 to 100% by weight Cr and up to 10% by weight rare-earth oxides or iron oxides, or mixtures of the two oxides.

3. A power connection element according to claim 1, wherein power connection wires or power connection metal sheets made of a nickel, cobalt or iron base alloy are connected to the current collector plate.

4. A power connection element according to claim 2, wherein power connection wires or power connection metal sheets mare of a nickel, cobalt or iron base alloy are connected to the current collector plate.

5. A power connection element according claim 1, wherein the intermediate layer consists of a predominantly oxidic material with a minimal conductivity of 0.1 S.cm$^{-1}$ at 1,000° C.

6. A power connection element according to claim 3, wherein the intermediate layer consists of a predominantly oxidic material with a minimal conductivity of 0.1 S . cm$^{-1}$ at 1,000° C.

7. A power connection element according to claim 1, wherein the intermediate layer consists of an oxidic glass with cations which increase the conductivity.

8. A power connection element according to claim 5, wherein the intermediate layer consists of an oxidic glass with cations which increase the conductivity.

9. A power connection element according to claim 1, further comprising an additional layer made of an electrically conductive oxide connecting said power connection element with the last cell of the fuel cell stack.

10. A power connection element according to claim 7, further comprising an additional layer made of an electrically conductive oxide connecting said power connection element with the last cell of the fuel cell stack.

11. A fuel cell stack having a plurality of series connected cells, and having a bipolar plate for connecting cells in said stack, said bipolar plate comprising:
a power connection element for planar fuel cells having a solid electrolyte on a $ZrO_2$ base, said power connection element comprising:
a ceramic plate having the composition

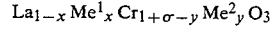

wherein $0.0 \leq x \leq 0.3$; $0 \leq y \leq 0.5$; $0 \leq \sigma \leq 0.05$, and wherein $Me^1$ is one of Ca, Sr and mixtures thereof, and $Me^2$ is one of Al, Mg, Co, Fe, and mixtures thereof;
an intermediate layer made of conductive glass which has a coefficient of thermal expansion of between 8 . 10$^{-6}$K$^{-1}$ and 12 . 10$^{-6}$K$^{-1}$ in the temperature range of from 20° C. to a transformation temperature of below 1,000° C., and a minimum conductivity of 0.1 S.cm$^{-1}$ at 1,000° C., said conductive glass containing alkalis or alkaline earths in an amount of from 1.0 to 20% by weight, and at least one metal oxide with several valency stages in an amount of from 10 to 85% by weight; and
a current collector plate made of a material having a thermal expansion coefficient of between 8 . 10$^{-6}$K$^{-1}$ and 12 . 10$^{-6}$K$^{-1}$ in the temperature range of 20° to 1,000° C., which material consists of a base alloy which is one of chromium, iron, nickel and cobalt, and which contains additional alloy elements in an amount of from 0.10 to 40% by weight, and dispersed oxides in an amount of from 0.02 to 10% by weight.

* * * * *